United States Patent [19]

Dumbeck

[11] Patent Number: 4,495,448
[45] Date of Patent: Jan. 22, 1985

[54] MEANS AND METHOD OF SENSING MOTOR ROTATION SPEED FROM STRAY ESCAPING FLUX

[76] Inventor: Robert F. Dumbeck, FM 3000 Box 548, Elgin, Tex. 78621

[21] Appl. No.: 318,699

[22] Filed: Nov. 6, 1981

[51] Int. Cl.³ .............................................. H02P 5/16
[52] U.S. Cl. ..................................... 318/54; 318/316; 310/68 B; 324/158 MG
[58] Field of Search ............... 318/565, 647, 653, 721, 318/52, 316, 310, 311, 319, 798–799, 804; 338/32 R, 32 H; 310/68 B; 73/520; 324/158 MG, 140 R; 336/220, 184, 188

[56] References Cited

U.S. PATENT DOCUMENTS

| | | | |
|---|---|---|---|
| 422,885 | 3/1890 | Hoyt | 336/270 |
| 1,905,216 | 4/1933 | Capps | 336/270 |
| 4,025,832 | 5/1977 | Jones | 318/316 |
| 4,082,968 | 4/1978 | Jones | 310/68 B |
| 4,176,305 | 11/1979 | Cuno | 318/651 |
| 4,329,636 | 5/1982 | Ushida et al. | 318/653 |
| 4,359,676 | 11/1982 | Fujioka | 318/653 |

FOREIGN PATENT DOCUMENTS 78615 12/1954 Netherlands ....................... 336/188

Primary Examiner—J. V. Truhe
Assistant Examiner—A. Evans
Attorney, Agent, or Firm—Laurence R. Brown

[57] ABSTRACT

For isolating dynamic rotational signal components from a dominating line frequency component in the stray magnetic fields escaping from the motor, a pick-up probe for instrumentation analyzing the motor characteristics is provided with a feedback winding and feedback circuit resonant therewith over a band including a harmonic of the normal motor rotational speed, i.e. full rated load speed. Thus, sensing of a-c induction motor conditions can occur with a single uncritically spaced external probe that needs no motor mechanical, photo or electrical additions or modifications. No access need be had to rotating motor shafts or driven mechanisms.

Thus for the first time instrumentation is made independent of installation of accessories by skilled technicians in existing locations for monitoring motor characteristics. Nor are special motors with special wiring, coils, rotating elements or accessories necessary to couple monitors.

Appropriate circuit analyzers determine from derived pulses representative of dynamic instantaneous rotation speed of the motor, such characteristics as slip, r.p.m., load, etc.

17 Claims, 3 Drawing Figures

4,495,448

MEANS AND METHOD OF SENSING MOTOR ROTATION SPEED FROM STRAY ESCAPING FLUX

TECHNICAL FIELD

This invention relates to instrumentation for determining operating characteristics of electrical motors and more particularly it relates to means and methods of detecting and analyzing motor operating conditions without requiring electrical or mechanical modifications or connections to the motor.

BACKGROUND ART

Instrumentation for determining loading and speed characteristics of motors is well known. Such instrumentation interpreting signals obtained from motor speed and analyzing slip characteristics of induction motors for example is described in my U.S. Pat. Nos. as follows:

4,063,112 for Induction Motor Load Monitor and Control Apparatus, Dec. 13, 1977.

4,101,831 for Load Monitoring Apparatus and Method, July 18, 1978.

4,141,244 for Load Indicating Metering Devices for Motor Driven Loads, Feb. 27, 1979.

4,194,129 for Armature Slip Analysis of Induction Motors, etc., Mar. 18, 1980.

4,194,178 for Electric Motor with Internal Wireless Load Monitor, Mar. 18, 1980.

A deficiency of this prior art, however, that limits its applicability to retrofit of both existing and new installations because of inconvenience or cost is the requirement for modification of the motor or system in such a way that signals can be derived representative of motor rotation data from which other motor characteristics are derivable.

Thus, it is an objective of the present invention to provide improved motor characteristic sensing means compatible with this prior art technology that permits immediate installation or use of instrumentation at a motor site without any access to the motor by means of mechanical, photo, or electrical modification or precise focussing, alignment or positioning of sensitive probes such as photo electric cells or those which must be precisely spaced and thus which cannot be used in limited access existing motor installations. With such improvement in motor characteristic sensing means the foregoing instrumentation and other instrumentation such as motor speed indicators can be made feasible for use in almost any existing motor installation.

Some prior art attempts have been made to sense motor characteristics without motor modifications. However, such motor characteristic sensing devices are very limited in application and function.

Thus, the sensing technique described in U.S. Pat. No. 4,138,642—Feb. 6, 1979 provides a sensing coil external to the motor, oriented with an axis perpendicular to the rotor of a permanent magnet motor at a critical position near a leading end of the permanent magnet, to derive variations in stray flux for providing an r.p.m. pulse count. This technique is limited to permanent magnet d-c motors and cannot be applied to a-c induction motors for example. Also, it is inoperable if the sensor coil is misplaced and thus cannot be used if the motor installation limits accessibility.

There are significant problems involved in sensing a-c motor stray flux because of the dominant strength of the basic generally 60 Herz power line frequency component as a result of high current flow therefrom. The stray flux of the much smaller magnitude rotational fields has thus prevented use of techniques of this type heretofore in the art, even though they are useful in the d-c permanent magnet motor art where no dominant a-c line frequency field exists, although subject to critical placement of the sensors both circumferentially and axially. Thus, the present invention has as an objective the provision of a sensor operable within the high line current field effect of an a-c induction motor.

In addition, it is an objective to provide an uncritical sensor position that is therefore operable at uncritical accessible locations on already existing motor installations in limited space, etc., and which are not subject to critical positioning by a skilled technician for operability.

Another sensor of limited application for determining the direction of rotation of an a-c electric motor is described in U.S. Pat. No. 3,943,504—Mar. 9, 1976. However, it cannot be used in the presence of the a-c current in an operating motor and must have two pick-up locations critically spaced at an angle related to the rotating field characteristics of the motor being tested. A separate high frequency source of test voltage is also required.

U.S. Pat. No. 4,179,744–Dec. 18, 1979 describes a method of analyzing the magnetic fields of passing d-c railway traction motors by pick-up coils located on the railroad ties to measure the passing of the opposite poles of the motor with the engine. This equipment has a limited purpose of sensing which motors are in proper running condition at full r.p.m. by sensing a limited number of cycles of rotation over train travel along the length of the motor. Also the alternator frequency can be determined.

There has been no known prior art instrumentation for enabling sensing equipment to isolate and process rotational signals from dominating line current noise in a-c induction type motors and no known solutions have been provided heretofore for the hereinbefore mentioned problems and deficiencies.

Other objects, features and advantages of the invention will be found throughout the following description, the drawings and the claims.

DISCLOSURE OF THE INVENTION

This invention therefore provides instrumentation for testing motor characteristics when it is operating under specified line power from a suitable source. No modifications to the motor or its driven system are necessary mechanically, photoresponsively or electrically for the purpose of providing test signals. Location of an external sensing probe at a single location is uncritical and thus a probe can reach into any accessible position in limited accessibility locations.

The probe senses stray magnetic flux escaping from the motor during rotor rotation and derives therefrom signals identifying the dynamic instantaneous motor rotation speed, even in the presence of strong a-c fields induced by high intensity line frequency current in the armature and stator during normal operation duty of a-c induction type motors, for example.

These signals are processed to determine motor characteristics by slip analysis techniques and analysis of the sensed dynamic rotation signals.

Sensing of signals with improved signal to noise ratio is feasible in the probe by placing a plurality of sensor coil axes in the probe substantially parallel to the motor rotor axis and providing positive feedback to a feedback coil in the probe coupled in a resonant circuit tuned to a band including a harmonic of the normal rotation speed of the motor, thereby overcoming the dominant line frequency components in a-c motors.

THE PREFERRED EMBODIMENT

Figure 3:
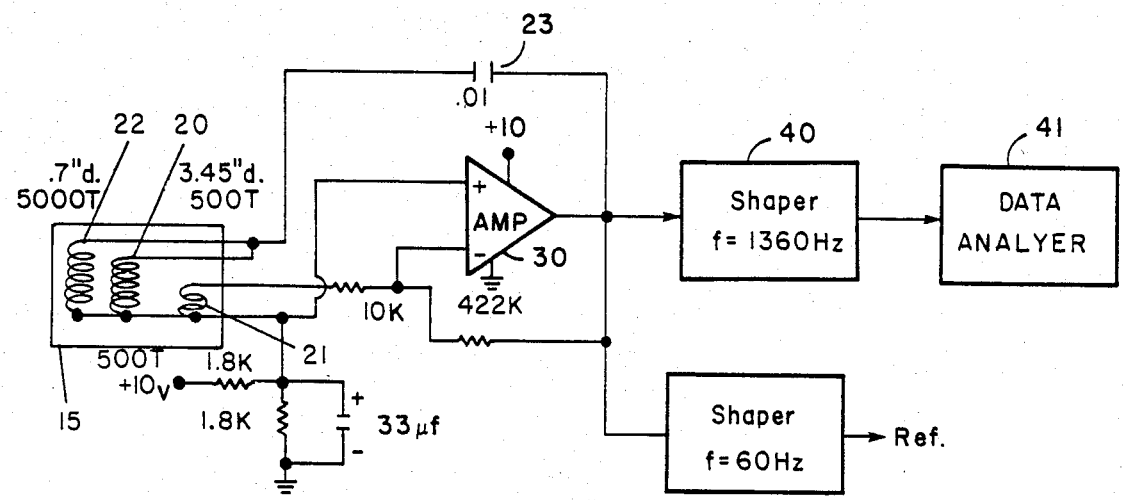
FIG. 3 is a schematic diagram of a typical signal processing system afforded by the invention.
Figure 1:
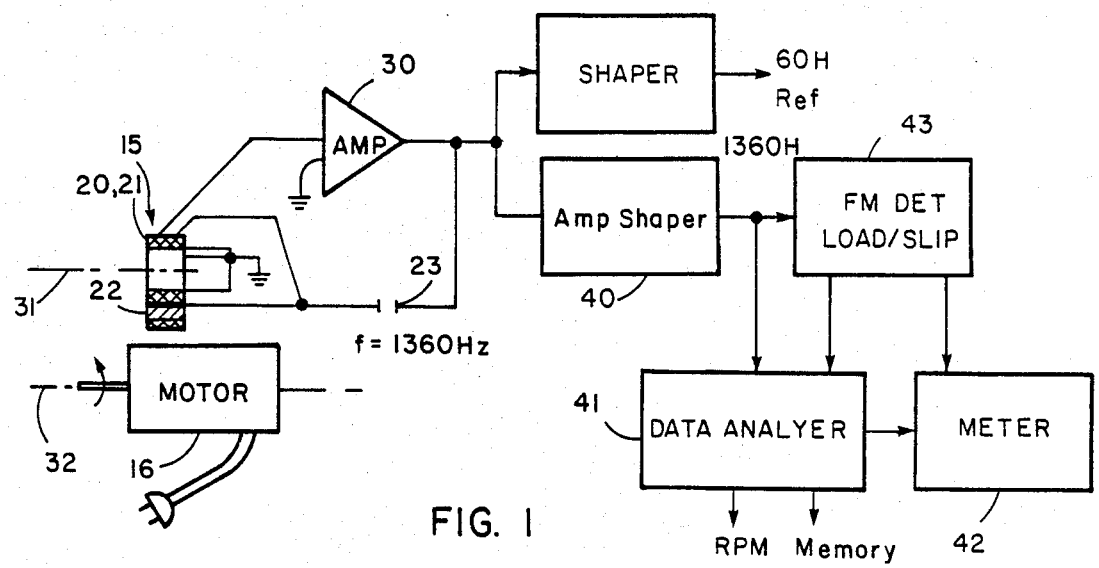
FIG. 1 is a block schematic diagram illustrating the techniques of this invention in sensing dynamically the motor characteristics with a single probe from stray electromagnetic fields about the motor.

The system for deriving electrical signals representative of motor characteristics in accordance with this invention is shown in block diagram in FIG. 1. Such characteristics as r.p.m., load, slip, etc. may be determined and used in the manner set out in my hereinbefore mentioned patents. These patents are incorporated as part of the present disclosure to the extent necessary, and thus the techniques of slip analysis or corresponding equipment need not be discussed herein in detail.

Figure 2:
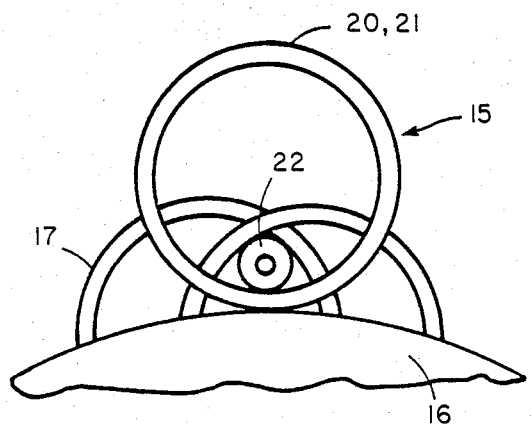
FIG. 2 is a partial enlarged end view of a sensor-motor relationship for pick-up.

The feature of this invention that was not set forth in the prior patents relates to the use of an external probe 15 that is not coupled to the motor 16 or its driven system by any electrical connections, mechanical modifications or photo sensing techniques. Rather, as shown better in FIG. 2, the probe 15 is responsive to stray magnetic fields 17 escaping from the motor 16 and thus need not be attached or coupled with any other sensor part on the motor such as a magnetic member or photo pick-up stripe positioned on a movable element or a coil or conductive connection accessible from the motor. The sole coupling between the motor 16 and probe 15 therefore is the stray magnetic field 17 that escapes from the motor housing, as the motor is normally running. In most applications the motor will be driving a load within its specified load capacity and thus the motor 16, for example, is sensed for load variations by the probe 15.

For load, slip and r.p.m. analysis it is desirable to sense a condition that is a function of the r.p.m. There will be a signal component affecting the stray flux field 17 as each of the rotor and stator poles pass. Thus, a typical 60 Hz induction motor produces a ripple frequency that varies in the range of 1350 Hz to 1380 Hz as the loading on the motor changes the slip. Of course, the frequency may differ in different motors with different numbers of rotor or stator slots. This ripple signal varies with rotation speed of the rotor and thus provides the slip and r.p.m. data that can be analyzed to indicate desired motor characteristic information.

It is, however, most difficult to detect and isolate the ripple signal because of the predominant 60 Hz line current flow in the motor windings. A most effective way of resolving this problem in accordance with this invention is to provide special probe windings and circuits as set forth in an exemplary embodiment in the three figures.

The particular probe construction found to be effective for this purpose, as shown, comprises two outer bifilar windings 20, 21 of 500 turns each about a 3.45 inch (8.76 cm) diameter form of 0.85 inch (2.2 cm) width and an eccentrically mounted winding 22 of 5000 turns about a 0.7 inch (1.8 cm) diameter form placed adjacent the inner form circumference of windings 20, 21, and adjacent the frame of motor 16 to receive the magnetic flux 17. The windings the air coupled in this embodiment.

Two of the windings 20, 22 are connected in parallel and form with capacitor 23 a series resonant filter bandpass circuit tuned to the ripple frequency band varying about 1365 Hz in the example given, or any of the harmonics 1, 2, 3, etc. thereof that might conveniently let the windings be smaller. Also, more effective filtering of the noise at 60 Hz and harmonics thereof occurs at higher filter frequencies. Note that for every motor revolution a plurality of 18 to 42 ripples may typically occur depending upon the number of rotor and armature slots and that r.p.m. signals are derived by count down of the ripples, or detected harmonic thereof. Also, the slip signal may be derived readily as shown by the referenced patents from one pulse per revolution if desired.

This resonant filter is connected in a positive feedback path from the operational amplifier 30 which is readily available as a standard circuit and is preferably of the f.e.t. input type. Thus, the desired ripple frequency representative of the rotation speed of the motor is fortified. Particularly in the case of induction motors, this circuit is effective in providing clean useful ripple signals isolated from 60 Hz noise. Thus, the harmonics of 60 Hz fall outside the passband width of the series resonant filter circuit and are eliminated, as made possible by the induction motor slip characteristics which establish the center frequency of the filter circuit generally set for specified full load conditions for the motor being tested.

It is to be noted that the probe coil axis 31 is oriented substantially parallel with the motor rotor axis 32 in the sensing mode. However, the probe is not critical in positioning at a particular place on the motor frame or near the motor frame, and thus can be inserted into a limited accessibility motor mount arrangement. There is no necessity for access to rotating or moving shaft or driven system parts for deriving a signal. Accordingly, a completely self contained external instrument can be afforded by this invention.

The ripple frequency pulses are suitably shaped at 40 and their data content analyzed at 41. There is a simple countdown, for example, to derive the instantaneous motor r.p.m., which can be displayed on a meter 42 digitally or in analog form. Historical information may be recorded in analog or digital form, as desired. The slip signals usuable as shown in the referenced patents is derivable by an F-M detector 43 since the frequency of the ripple signal changes as a function of the r.p.m. (slip) of the motor under variations of load conditions.

This technique therefore provides a triggered feedback oscillator, which oscillates only in the presence of a repetitive pulse sequence related to its tuned frequency bandpass, and which is locked in at a frequency varying over a slip range with the ripple pulses.

Therefore this invention affords a novel method of deriving an electrical signal varying in characteristic as a function of the operational characteristics (i.e. speed, slip, load) of a motor. It is thus possible, while normally operating the motor, to place an external instrument in position (without any motor preparation or modification) and pick up signals from the escaping magnetic flux field patterns near the motor housing. These signals are then processed to provide signals representative of the instantaneous rotational speed of the motor from which r.p.m., slip, load and other motor characteristic data may be derived. The provision of positive feedback through a resonant circuit permits derivation of desired ripple frequency signals from the surrounding dominant line frequency background noise.

Accordingly, for the first time this invention provides a feasible way of analyzing characteristics of a motor running in its normally loaded condition with an external instrument that does not require site preparation, coupling sensors or expert knowledge in location of sensing probes at critical positions on the motor frame or mount. No special prewiring or conditioning of the motor is required so that this method and instrumentation is well adapted for use on existing installations. It may also be portable equipment used for test purposes as needed for various motor installations throughout a plant, for example.

Having therefore advanced the state of the art, those novel features believed descriptive of the spirit and nature of the invention are set forth with particularity in the claims.

Industrial Application

Simplified instrumentation is made available for monitoring characteristics of a motor in operation in situ. Thus, a non-critical probe is positioned near the motor housing to sense stray fields modulated by the dynamic rotating speed of the motor. The sensed signals are then processed to provide rotational speed signal pulses and derived loading characteristics without modification of the motor or access to rotatable parts. For the first time a-c motors may be sensed by means of an external probe that is not dominated by fields produced by heavy line currents flowing in the motor.

I claim:

1. The method of deriving an electrical signal varying in characteristic as a function of the operational characteristics of a motor with electromagnetic stator and rotor windings comprising the steps of,
   operating the motor under rated conditions from a specified line power source,
   picking up signals from the stray magnetic flux field escaping from the motor stator and rotor interaction without requiring motor modifications for the purpose of providing a signal by placing an electromagnetic sensor responsive to the escaping magnetic flux within said field to sense the flux without any conductive or mechanical connections to the motor,
   and processing the signals derived from the escaping magnetic flux by said sensor to derive from that flux information representative of the rotational speed of the motor.

2. The method of claim 1 including the step of producing from said signals derived from the flux an analog signal representative of the dynamic slip characteristics of the motor.

3. The method of claim 1 including the step of producing from said signals derived from the flux a digital representation of instantaneous slip characteristics of the motor.

4. The method of claim 1 including the step of fortifying the electromagnetic signals sensed by the sensor by amplifying the sensed signals deriving a frequency therefrom by band passing only those signals in the range of a motor speed harmonic and providing positive feedback of these amplified signals into the sensor.

5. The method of deriving an electrical signal varying in characteristic as a function of the operational characteristics of a motor with electromagnetic stator and rotor windings comprising the steps of, operating the motor under rated conditions from a specified line power source, picking up signals from the stray magnetic flux excaping from the motor without requiring motor modifications for the purpose of providing a signal by placing an electromagnetic sensor responsive to the escaping magnetic flux within said field to sense the flux without any conductive or mechanical connections to the motor, processing and signals derived from the escaping magnetic flux by said sensor to produce information representative of the rotational speed of the motor, fortifying the electromagnetic signals sensed by the sensor by amplifying the signals and providing positive feedback of the amplified signals into the sensor, relatively positioning a plurality of windings in the sensor, providing one of the windings of a smaller diameter compared with larger diameters of the other windings, coaxially positioning the windings of larger diameter, offsetting the smaller diameter winding to a position adjacent a circumferential portion of the larger windings, and providing said positive feedback into the offset winding.

6. The method of claim 5 including the step of positioning the axis of said coaxially positioned windings substantially parallel to the axis of the motor armature.

7. The method of deriving an electrical signal varying in characteristic as a function of the operational characteristics of a motor with electromagnetic stator and rotor windings comprising the steps of, operating the motor under rated conditions from a specified line power source, picking up signals from the stray magnetic flux escaping from the motor without requiring motor modifications for the purpose of providing a signal by placing an electromagnetic sensor responsive to the escaping magnetic flux within said field to sense the flux without any conductive or mechanical connections to the motor, processing the signals derived from the escaping magnetic flux by said sensor to produce information representative of the rotational speed of the motor, fortifying the electromagnetic signals sensed by the sensor by amplifying the signals and providing positive feedback of the amplified signals into the sensor, and providing the positive feedback through a circuit tuned to a signal frequency harmonically related to the normal rotation speed of the induction motor.

8. The method of claim 1 including the step of positioning the sensor at a single sensing position in the escaping flux pattern of the motor.

9. The method of claim 1 including the step of producing from the flux field an a-c signal of a frequency derived from the rotation speed of the motor.

10. Instrumentation for providing electrical signals representative of the rotation speed of a motor with electromagnetic stator and rotor windings by pick-up of the magnetic flux escaping from the stator-rotor interaction when operated from a specified line power source without requiring any mechanical or electrical modifications to the motor, comprising in combination, an electromagnetic sensing probe for response to said escaping flux when positioned in the vicinity of the motor, at least one pick-up winding and one feedback winding on said probe, and electronic means for amplifying signals sensed by said probe from the escaping flux of the motor and providing positive feedback signals to said feedback winding, thereby to produce a significant signal to noise improvement of the signal components representative of the rotation speed of the motor.

11. Instrumentation as defined in claim 10 wherein the electronic means providing the feedback signals provides feedback by way of a tuned circuit resonant to a frequency band about a harmonic of the operational rotation frequency of the motor armature thereby to produce a fortified sensed signal representative of the rotation of the motor.

12. Instrumentation as defined in claim 10 wherein the tuned circuit is resonant at a harmonic of a frequency induced in the sensor by the armature poles of the motor as they rotate and provide escaping flux sensed by the pick-up winding.

13. Instrumentation as defined in claim 10 including means for further processing the signals derived from the probe and means for amplifying the signals to derive a signal representative of the slip characteristics of the motor.

14. Instrumentation as defined in claim 10 wherein the windings are located with an axis substantially parallel to the axis of rotation of the rotating element of the motor.

15. Instrumentation as defined in claim 10 wherein the sensing probe comprises at least one electromagnetic pick-up winding having a circumference of a predetermined diameter oriented about a winding axis, and a feedback winding of a smaller diameter positioned eccentrically within the pick-up winding with a feedback winding portion adjacent the circumference of the pick-up winding.

16. Instrumentation for providing electrical signals representative of the rotation speed of a motor with electromagnetic stator and rotor windings operated from a specified line power source by pick-up of the magnetic flux escaping from the rotor-stator interaction without requiring any mechanical or electrical modifications to the motor, comprising in combination, an electromagnetic sensing probe for deriving signals from said escaping flux when positioned adjacent a motor, and electronic circuit means for processing the sensed flux signals to produce therefrom a signal representative of the rotation speed of the motor, For the two added independent claims the fee is paid by the enclosed deposit account order form.

17. Instrumentation as defined in claim 16 wherein the electronic sensing probe contains electromagnetic windings with an axis adapted to derive signals for processing by said circuit means when oriented substantially parallel to the axis of rotation of the motor rotor.

* * * * *